Sept. 4, 1951  H. C. OTIS  2,566,773
SAFETY CONTROL VALVE
Filed Feb. 4, 1947
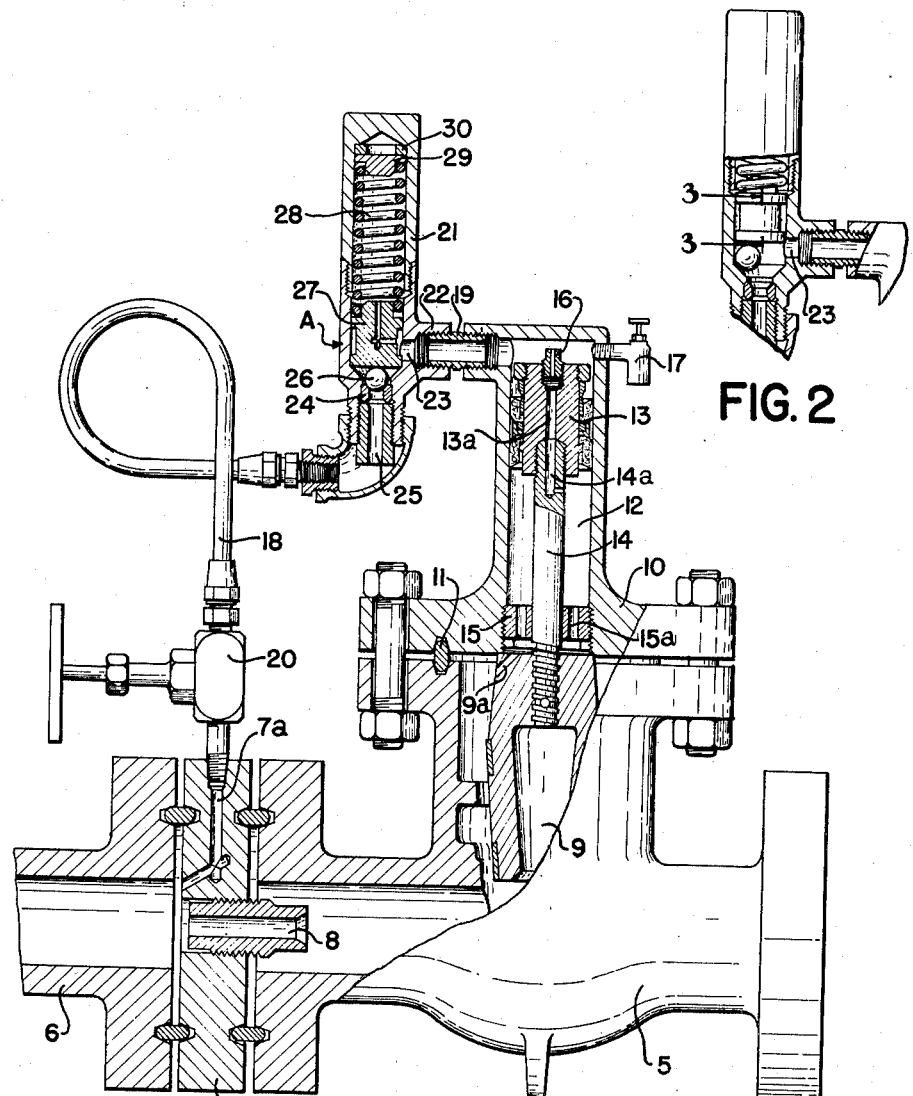
FIG. 2
FIG. 1
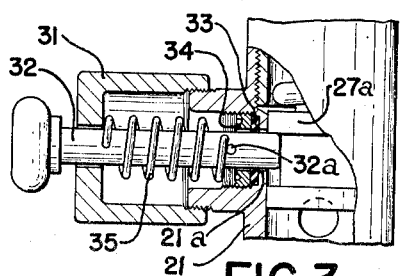
FIG. 3
HERBERT C. OTIS
INVENTOR.
BY J. Vincent Martin
Ralph R. Browning
James B. Simms
ATTORNEYS Patented Sept. 4, 1951

2,566,773

UNITED STATES PATENT OFFICE 2,566,773

SAFETY CONTROL VALVE

Herbert C. Otis, Dallas, Tex.

Application February 4, 1947, Serial No. 726,374

17 Claims. (Cl. 137—153)

This invention relates to improvements in safety valves and refers more particularly to safety valves actuated by the pressure differential across a flow restrictor in the passage controlled by the device. The valve may be used in pipe lines such as for example transmission lines, intake and discharge lines of recycling plants, discharge lines from high pressure oil or gas well head control assemblies or the like.

The safety device of this invention is energized by the pressure drop across a flow restrictor or choke placed in the passage which is to be controlled by the valve. The flow restrictor is of such capacity that at normal rates of flow the resulting pressure drop across the restrictor is not sufficiently great to actuate the valve but at undesirable higher rates of flow the pressure differential developed is sufficient to close the valve. The connection between the valve actuating mechanism and the conduit on one side of the flow restrictor is controlled by a pressure responsive valve. This valve normally is closed but opens when predetermined control pressure conditions occur to energize the valve actuating mechanism. A requisite of such a device is that the valve closure be shifted instantly upon the occurrence of the predetermined pressure conditions. It has also been found desirable to eliminate from the control elements the variable lagging effects due to packing held under pressure as well as the prevention of the formation of hydrates at the control elements.

An object of this invention is to provide a rugged pressure differential type safety valve in which the valve closure member is actuated with a snap action instantly upon the occurrence of a predetermined flow condition.

Another object is to provide a pressure differential type safety valve wherein no packing or stuffing is utilized in the controls for the valve.

A further object is to provide a pressure differential type safety valve in which there is little likelihood of the formation of hydrates in the control mechanism for the valve.

Yet another object is to provide a pressure differential type safety valve wherein the pressure actuated mechanism for the valve closure member is subjected to the full pressure differential across the flow restrictor substantially instantaneously upon the occurrence of a predetermined pressure condition.

A still further object is to provide a control for the actuating mechanism for pressure differential type safety valves in which the control utilizes an auxiliary normally closed pressure responsive valve wherein the unseating force in response to a control pressure is increased upon a partial opening of the auxiliary valve whereby the auxiliary valve is substantially or completely opened with a snap action immediately upon occurrence of a predetermined flow condition.

Other and further objects of the invention will appear from the following description.

In the accompanying drawings which form a part of the intant specification and are to be read in conjunction therewith and wherein like reference numerals are used to designate like parts in the various views:

Fig. 1 is a side elevational view of a safety valve embodying this invention with parts shown in section;

Fig. 2 is a fragmentary view partially in section illustrating the control valve of the device of Fig. 1 with the valve in open position; and Fig. 3 is a view taken along the line 3—3 in Fig. 2 in the direction of the arrows.

Referring to the drawings, numeral 5 designates the valve body with a passageway therethrough and adapted to be interposed in a conduit 6. A flow restrictor plate 7 is interposed between the flanged inlet of body 5 and the adjacent flange connection of line 6. This plate carries a flow restrictor or choke 8 which will be more mully hereinafter described. The body 5 has operably mounted therein a closure member 9 which by way of illustration is shown in the form of a gate adapted to close the passage controlled by the valve when in its lower position as will be understood by those skilled in the art.

A mechanism has been provided for shifting the closure member 9 in response to the pressure differential across choke 8. This mechanism is housed within the bonnet 10 secured to body 5 by the usual nuts and bolts with a seal ring 11 interposed between the opposed grooved surfaces of the flanges of the bonnet and body. A chamber or cylinder 12 is formed in the bonnet and carries the pressure responsive member illustrated as a two way piston 13. The pressure responsive member has a drive connection with closure member 9 through rod 14 which is threaded at its ends to the piston and closure member. A guide ring 15 is threaded into the lower end of chamber 12 and has a central aperture through which stem 14 extends.

Chamber 12 communicates with the interior of valve body 5 and the interior of the controlled passage downstream from the restrictor 8. This communication is provided by vertical passages 15a in ring 15 and passages 9a in gate 9. The cups of piston 13, have a close substantially leakproof fit with the internal wall of cylinder 12. However, communication between the upper and lower compartments of the chamber is provided by passages 14a and 13a in the stem and piston respectively, and choke 16 in the upper end of passage 13a. This communication between the compartments of cylinder 12 is a restricted passage whereby the pressure within the compartments is able to equalize in time but which does not permit immediate equalization when the pressure responsive member is subjected to a pressure differential. A pressure release valve 17 is provided for the upper compartment of chamber 12 and will be discussed further in connection with the shifting of closure member 9 from closed to open position.

Chamber 12 also has a connection with the fluid to be controlled on the upstream side of choke 8 through line 18 and the pressure responsive valve indicated generally as A. The valve A is connected to chamber 12 by nipple 19 and is connected at its lower end to one end of line 18. The other end of line 18 has a connection controlled by manually operated valve 20 with a channel 7a in restrictor plate 7. Channel 7a communicates with the interior of the flow passage upstream from choke 8. Valve 20 will be hereinafter discussed with release valve 17 relative to the opening of closure member 9.

This connection for supplying high pressure fluid to chamber 12 is controlled as has been indicated by valves 20 and A. The pressure responsive valve A is made up of a two piece housing 21 having a lateral boss 22 surrounding outlet port 23 and threaded to niple 19. The inlet at the lower end of housing 21 has a seat ring 24 disposed therein. This ring is positioned between an internal shoulder in the inlet to housing 21 and a positioning ring 25 threaded in the inlet.

The control for the pressure responsive valve A comprises the valve element 26 and a resilient element made up of block or piston 27 and compression spring 28. Spring 28 is compressed between piston 27 and block 29. Block 29 is spaced from the end of housing 21 by washer 30. By varying the size or number of washers 30 the compression of spring 28 can be adjusted to a selected value to determine the pressure differential to which the valve will be responsive.

It will be seen that block or piston 27 substantially fills the bore of housing 21 and in the position shown in Fig. 1 with ball valve 26 seated against the downstream side of seat ring 24 block 27 covers port 23. It is also important that the pressure face of piston 27 has a substantially greater area than does seat ring 24. Thus, a substantial leakage of fluid past ball 26 quickly raises the pressure exerted against the working face of piston 27 to substantially the pressure on the upstream side of choke 8. As this pressure is the same that was exerted against the area of ball 26 exposed across the seat the resulting force opposing spring 28 is materially increased whereby piston 27 is rapidly and positively moved to the position shown in Fig. 2. A passage in block 27 communicates between port 23 and the interior of housing 21 to prevent a buildup of pressure which would resist movement of block 27 in response to the pressure differential as above outlined. Piston 27 is locked in the Fig. 2 position by suitable detent such as that shown in Fig. 3. The detent includes a suitable guide brace 31 slidably receiving pin 32 which extends through an aperture 21a in the wall of housing 21. Packing 33 is held in place about rod 32 by gland 34. Spring 35, pressed between the end of brace 31 and a peg 32a on pin 32, urges the pin through the aperture 21a. Normally the end of pin 32 abuts the portion of enlarged diameter 27a of the periphery of block 27. However, with the block in Fig. 2 position pin 32 is advanced into the peripheral groove on block 27 and prevents the return of block 27 to the Fig. 1 position until pin 32 has been manually retracted.

As heretofore indicated valve 20 is a manual valve controlling flow through line 18. Normally this valve is open but with pressure release valve 17 provides a means for energizing piston 13 when in a lower position within chamber 12 to shift the gate from a closed to an open position. To accomplish this valve 20 is closed and the pressure release valve 17 is opened creating a pressure differential across piston 13 so that the pressure of the control fluid downstream from choke 8 serves to actuate piston 13 raising it to its Fig. 1 position. When piston 13 has been raised valve 17 may be closed and after sufficient time has been allowed to build up the pressure within the upper compartment of chamber 12 valve 20 may then be opened. Opening of valve 20 completes the resetting of the safety valve.

It is contemplated that in lieu of the pressure actuated resetting means of the safety valve a manually operated mechanism may be provided for raising piston 13 and closure member 9 to the raised position. However, such a mechanism usually involves the use of a stem extending through the bonnet 10 and having a moving connection through a suitable stuffing box. For most purposes this is undesirable as the requisite stuffing box is subject to failure and the extension of the stem exteriorly of the bonnet reduces the effective working area of the piston 13. This reduction in the area of the working face of piston 15 in turn necessitates the use of a flow restrictor 8 of less capacity to create a greater pressure differential thereacross.

It is believed that the assembly of the device will be apparent to those skilled in the art from the foregoing description. In operation the assembled device is interposed in the flow passage 6 with the parts in position shown in Fig. 1. The compartments of chamber 12 both above and below piston 13 have communication with the fluid controlled downstream from choke 8 through the valve body 5, passages 9a and 15a of the closure and guide ring respectively, and passages 14a and 13 of the stem and piston, respectively, and choke 16. However, the connection between the chamber and the fluid to be controlled upstream from choke 8 is closed as valve member 26 is normally seated. The likelihood of formation of hydrates in the control device is greatly reduced as there is substantially no leakage past ball 26 under normal operating conditions.

The closure member 9 of the safety device will remain in the raised or open position until the flow across choke 8 reaches a predetermined condition such that the pressure differential thereacross is great enough to overcome the spring 28 of the pressure responsive valve A. It will be appreciated that valve member 26 has that portion of its surface which is surrounded by seat 24 exposed to the upstream or high pressure while that portion downstream from seat 24 is exposed to the downstream pressure of the controlled fluid as piston 27 has a close fit but not a leak-proof fit in the bore of housing 21. Thus, the force opposing spring 28 is equal to the pressure differential across choke 8 times the area of ball valve 26 which is encircled by seat 24. Very slight leakage past valve 26 will not materially increase the pressure on the downstream side of valve 26 because the piston 27 has a close but not a leakproof fit in the housing 21. Nevertheless, substantial leakage past valve member 26, which will occur when the flow past choke 8 reaches a predetermined rate, quickly raises the pressure between the piston and seat to substantially the pressure on the upstream side of choke 8. The relatively large pressure face of piston 27 is exposed to this pressure and results in an increased force opposed to spring 28. Inasmuch as the lesser force which was transmitted through ball valve 26 was sufficient to partially collapse spring 28 the increased force obviously quickly collapses spring 28 whereby piston 27 is locked in its Fig. 2 position by the detent illustrated in Fig. 3. With piston 27 in Fig. 2 position port 23 is exposed so that the pressure of the controlled fluid is supplied to the upper compartment of chamber 12. Due to the restricted character of the passage through choke 16 the pressure differential is created across the pressure responsive member 13. This pressure differential energizes the piston 13 shifting it to a lower position within chamber 12. This movement of piston 13 is transmitted to gate 9 forcing it rapidly and positively to its seated position in the valve body. Thus a snap action is provided for closing the safety valve closure member and the closure member is held in its lowered or closed position.

It is obvious that in the arrangements illustrated the controlled pressure for the valve A is the pressure differential across the choke 8. However, this is shown by way of illustration and not by way of limitation. It is contemplated that any other suitable means may be used to create a flow differential which is a function of the rate of flow. Examples of such other means are Venturi tubes, "Pitot" tubes and the like.

When it is desired to shift closure member 9 in the opposite direction to that just described, the valve 20 is shut and pressure release valve 17 is opened. Release of pressure above pressure responsive member 13 thus energizes the piston causing it to shift the gate to the raised position. The resetting of the safety device is completed by closing release valve 17 and opening valve 20.

It will be seen that the objects of the invention have been accomplished. There has been provided a safety valve which is positively actuated with a snap action by the pressure differential across a flow restrictor and the passage to be controlled by the device. The construction is such that the actuating mechanism is controlled in response to a controlled pressure differential. The arrangement is such that the pressure responsive member of the actuating mechanism is energized substantially instantly when a predetermined control condition occurs. There has been provided a control valve for the actuating mechanism which operates with a snap action eliminating any likelihood of throttling of the main valve. The device is rugged, may be economically manufactured, assembled and installed, eliminates the necessity for use of stuffing and other sealing materials about moving parts, and has great utility as a safety device in handling high pressure fluids.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. In combination a valve with a closure member operable therein, an actuating mechanism for the closure member including means responsive to a pressure differential, said means having a drive connection with the closure member, a flow passage, means providing a restriction in the passage, operable connections between said means and the passage on both sides of the restriction means and a control device controlling the connection leading to upstreams of the restriction and adapted to open in response to the pressure differential across the restriction when the differential reaches a predetermined limit to subject said means to the pressure differential across the restriction means to energize said means and shift the valve closure member.

2. In combination a valve with a closure member operable therein, an actuating mechanism for the closure member including means responsive to a pressure differential, said means having a drive connection with the closure member, a flow passage, means providing a restriction in the passage, operable connections between said means and the passage on both sides of the restriction means and a control device controlling the connection leading to upstream of the restriction means and exposed to the pressure differential across said restrictor, said control device adapted to open in response to said pressure differential when a predetermined flow condition occurs in the passage whereby the actuating mechanism is energized to shift the valve closure member.

3. In combination a valve having a body with a passageway therethrough, a closure member within the body operable to control the passageway, and mechanism for shifting the closure member including a flow restrictor means adaptable to create a pressure differential in the fluid to be controlled by the valve, a chamber with a pressure responsive member therein operably connected to the closure member and dividing the chamber into two compartments, means for supplying control fluid from downstream of the flow restrictor means to the compartments, a connection for supplying fluid to be controlled to one of the compartments from upstream of the restrictor means and a normally closed pressure responsive valve controlling said connection and adapted to open in response to pressure of a control fluid when the control pressure reaches a predetermined limit whereby the pressure responsive member is actuated to shift the closure member.

4. The combination of claim 3 wherein means are provided to selectively release the pressure within the compartment controlled by the pressure responsive valve whereby the closure member may be shifted by the pressure of fluid on the downstream side of the flow restrictor.

5. The combination of claim 3 wherein the pressure responsive valve is adjustable.

6. In combination a valve having a body with a passageway therethrough, a closure member within the body operable to control the passageway, and mechanism for shifting the closure member including a flow restrictor means adaptable to create a pressure differential in the fluid to be controlled by the valve, a chamber with a pressure responsive member therein operably connected to the closure member and dividing the chamber into two compartments, means for supplying control fluid from downstream of the flow restrictor means to the compartments, a connection for supplying fluid to be controlled to one of the compartments from upstream of the restrictor means and a normally closed pressure responsive valve controlling said connection and adapted to open in response to the pressure differential across said flow restrictor means when the differential reaches a predetermined limit.

7. In a valve having a body with a flow passage therethrough, a flow restrictor adapted to create a pressure differential in the fluid to be controlled by the valve, a closure member operable to shut the passage and pressure actuated mechanism operably connected to the closure member, said mechanism having connections communicating with the control fluid both upstream and downstream of the restrictor, and a valve controlling the connection communicating with the passage on the high pressure side of the restrictor, said valve responsive to the pressure differential across the restrictor and adapted to open when the differential reaches a predetermined limit whereby the actuating mechanism is energized to shift the closure member.

8. In combination a valve having a body with a passageway therethrough, a closure member within the body operable to control the passageway, and mechanism for shifting the closure member including a means providing a restriction in the passage adapted to create a pressure differential in the fluid to be controlled by the valve, a chamber with a pressure responsive member therein operably connected to the closure member and dividing the chamber into two compartments, a restricted passage between the compartments, means for communicating between one compartment and the fluid to be controlled downstream of the flow restrictor, a connection for supplying fluid to be controlled to the other compartment from upstream of the flow restrictor and a normally closed pressure responsive valve controlling flow through said means, compartments and connection, said pressure responsive valve adapted to open when the pressure differential across the flow restrictor reaches a predetermined limit to energize the pressure responsive member and shift the closure member.

9. In combination a valve having a body with a passageway therethrough, a closure member within the body operable to control the passageway, and mechanism for shifting the closure member including a flow restrictor adaptable to create a pressure differential in the fluid to be controlled by the valve, a chamber with a pressure responsive member therein operably connected to the closure member and dividing the chamber into two compartments, a restricted passage between the compartments, means for communicating between one compartment and the fluid to be controlled downstream of the flow restrictor, a connection for supplying fluid to be controlled to the other compartment from upstream of the flow restrictor and a normally closed pressure responsive valve controlling said connection and adapted to open in response to pressure of a control fluid when the control pressure reaches a predetermined limit whereby the pressure responsive member is energized to shift the closure member.

10. In combination a valve having a body with a passageway therethrough, a closure member within the body operable to control the passageway, and mechanism for shifting the closure member including a flow restrictor adaptable to create a pressure differential in the fluid to be controlled by the valve, a chamber with a pressure responsive member therein operably connected to the closure member and dividing the chamber into two compartments, a restricted passage between the compartments, means for communicating between one of the compartments and the fluid to be controlled downstream of the flow restrictor, a connection for supplying fluid to be controlled to the other compartment from upstream of the flow restrictor and a normally closed pressure responsive valve controlling said connection and adapted to open in response to the pressure differential across said flow restrictor when the differential reaches a predetermined limit to energize the pressure responsive member and shift the valve closure.

11. The combination of claim 10 wherein means are provided to selectively release the pressure within the compartment communicating with the pressure responsive valve whereby the closure member may be shifted in response to pressure of fluid on the downstream side of the flow restrictor.

12. In combination a valve having a body with a passageway therethrough, a closure member within the body operable to control the passageway, and mechanism for shifting the closure member including a flow restrictor adaptable to create a pressure differential in the fluid to be controlled by the valve, a chamber with a pressure responsive member therein operably connected to the closure member and dividing the chamber into two compartments, means communicating between the compartments and the fluid to be controlled from downstream of the flow restrictor, a connection for supplying fluid to be controlled to one of the compartments from upstream of the restrictor, a passage between the compartments restricted relative to the upstream connection, and a normally closed pressure responsive valve controlling said connection, said pressure responsive valve comprising a seat in the upstream pressure connection leading to one of the compartments, a valve element engageable with the downstream side of the seat, a resilient member urging the valve element against the seat, said member substantially blocking the high pressure passage downstream from the seat except when the valve member is substantially unseated and presenting a face exposed to the pressure within the connection, said face having a greater area than the area across the seat whereby substantial leakage of fluid past the valve provides a greater force opposed to the resilient member insuring substantial unseating of the valve element to prevent throttling of the element.

13. The combination of claim 12 wherein releaseable detent means are provided to retain the resilient member in collapsed position.

14. The combination of claim 12 wherein a spring pressed block constitutes the resilient member.

15. The combination of claim 12 wherein means are provided to selectively release the pressure within the compartment controlled by the pressure responsive valve whereby the closure member may be shifted by the pressure on the downstream side of the restriction.

16. In combination a valve with a closure member, an actuating mechanism including a pressure responsive member operably connected to the closure member to shift the closure member from one position to another in response to a pressure differential, a flow passage, means for creating a pressure differential in the passage as a function of fluid flow therethrough, connecting means for subjecting the pressure responsive member to the pressure differential created in the flow passage and a control device for said connecting means, means subjecting the control device to the pressure differential across said means, said control device being adapted to normally close said connecting means but to open when said pressure differential reaches a predetermined amount to energize said actuating mechanism and shift the closure member.

17. In combination a valve with a closure member operable therein, an actuating mechanism for the closure member including means responsive to a pressure differential, said means having a drive connection with the closure member, a flow passage, means for creating a pressure differential in the passage which is a function of the rate of flow through the passage, operable connections for subjecting the responsive means to the pressure differential created by the latter means and a control device controlling the connection to upstream of the differential creating means and exposed to the pressure differential created in said passage, said control device adapted to open in response to said pressure differential when a predetermined flow condition occurs in the passage whereby the actuating mechanism is energized to shift the valve closure member.

HERBERT C. OTIS.

REFERENCES CITED

The following references are of record in the file of this patent:

UNITED STATES PATENTS

| Number | Name | Date |
| --- | --- | --- |
| 871,260 | Dyer | Nov. 19, 1907 |
| 1,646,640 | Daniel | Oct. 25, 1927 |
| 1,745,059 | Rush | Jan. 28, 1930 |
| 2,079,135 | Turner | May 4, 1937 |
| 2,227,297 | Coy | Dec. 31, 1940 |
| 2,251,275 | Ernst | Aug. 5, 1941 |
| 2,420,370 | Hamilton | May 13, 1947 |